Patented Apr. 22, 1941

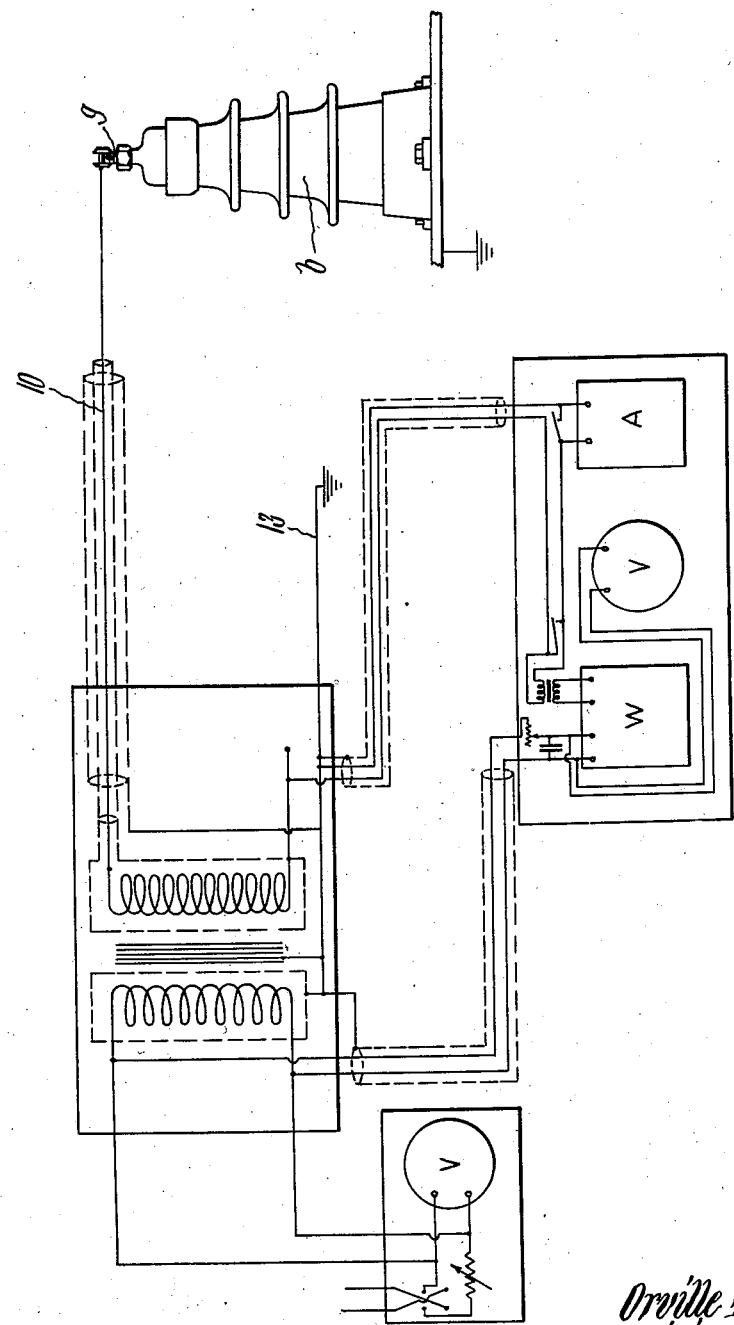

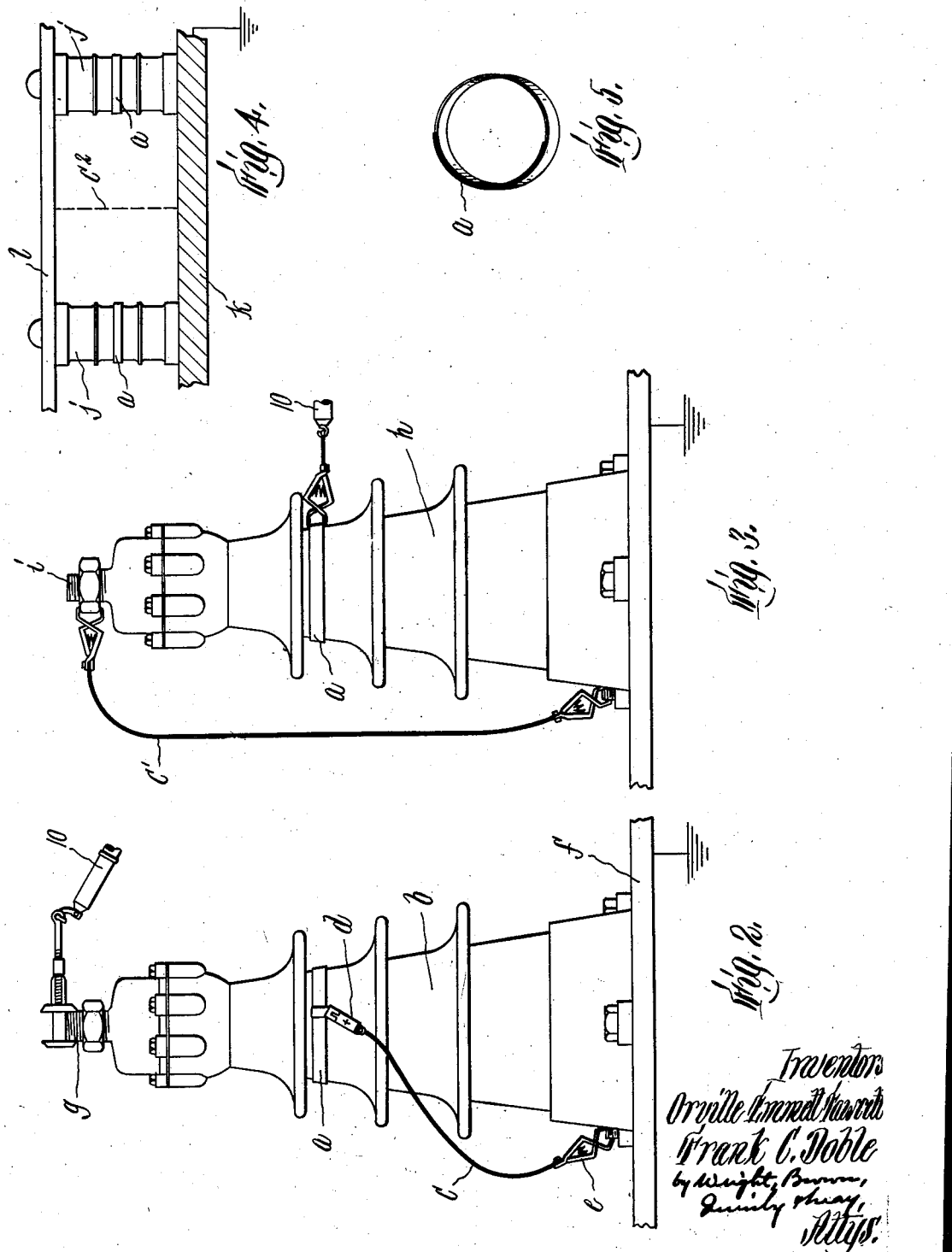

2,239,598

UNITED STATES PATENT OFFICE 2,239,598

METHOD OF TESTING INSULATING BUSHINGS AND THE LIKE

Orville Emmett Fawcett, Mount Lebanon, Pa., and Frank C. Doble, Cambridge, Mass., assignors to Doble Engineering Company, Medford, Mass., a corporation of Massachusetts Application January 29, 1938, Serial No. 187,586

5 Claims. (Cl. 175—183)

The present invention is concerned with the testing of electrical insulation to determine whether it is reliable or defective, by measuring the energy loss through, and the charging current or capacitance of, the insulation when alternating voltage of known value is applied to the insulation in the field, i. e., the location where it is set up for use. In the patent of Frank C. Doble, No. 1,945,263, dated January 30, 1934, an apparatus for this purpose is described, and its utility and manner of use explained for determining the qualities of various types of insulators, including the bushings of oil circuit breakers. The present invention is a further step which may be carried out by the use of the apparatus shown in said patent, or equivalent apparatus, and associated means, and by which refinements and precision or definiteness of result, not therein described, are secured.

For example, the test method disclosed in said patent, and the usual procedure prior to the present invention, is to connect the cable, by which the test voltage is applied, to the conductive terminal of the bushing or specimen under test. In practically all cases the flange of the bushing is connected to ground in some manner such that, when alternating voltage is applied between the non-grounded terminal and the grounded terminal of the bushing or other test specimen, current will flow in the circuit so composed. This current may be considered as being made up of the charging current through the insulation under test and the current due to continuous or semi-continuous leakage paths through, or over the surface of, the insulation. In outdoor apparatus, such as oil-circuit-breaker bushings or transformer bushings, there is usually a porcelain covering over the main bushing insulation. This porcelain also serves as insulation, and at the same time serves as a means for protecting the main insulation of the bushing from the elements such as rain and snow. Such a part is called the rainshield. It is commonly corrugated so as to lengthen the inevitable leakage paths between the conducting stud which passes through the center of the insulation and the ground flange of the bushing. The ground flange of the bushing serves as a means for mounting the bushing in position and also acts as the grounded terminal. The ordinary test on such a bushing, whether it be located in a transformer, oil circuit breaker, or associated with other pieces of equipment, consists of disconnecting the conducting stud of the bushing from associated apparatus such as transformer windings, etc., and applying an alternating test potential between the conducting stud and the grounded flange and determining quantities indicative of the energy loss and the charging current at a definite voltage. From the energy loss and charging current at a definite voltage the power factor of the specimen under test may be determined by the well known formula, viz: power factor equals watts loss divided by the product of volts applied times amperes. The power factor is a good indication of the condition of insulation inasmuch as the power factor of the insulation does not depend upon the size of the test specimen but only upon its quality as insulation. There would be no energy loss whatsoever in a perfect insulator and as a consequence a perfect insulator would have zero power factor. Thus the power factor of the insulation is indicative of its electrical insulation qualities.

A common type of fault which may develop in bushings is due to moisture which seeps through the gaskets which mechanically connect the center stud of the bushing to a flange cemented to the rainshield. If moisture enters the main insulation of the bushing, deterioration begins, and if this condition is allowed to persist, it may eventually lower the breakdown resistance of the insulation to such a point that the bushing may fail in service. It is desirable, therefore, to determine such an incipient fault caused by moisture before the deterioration of the main insulation of the bushing has progressed sufficiently to be a failure hazard. In the case of the ordinary test previously spoken of which consists in applying voltage between the center electrode and the grounded flange of the bushing and determining its power factor, the electrostatic stress due to the applied voltage is a maximum between the ground flange and the center conductor and is a great deal less through the upper portion of the bushing insulation. As a consequence of this condition moisture in the upper portion of the bushing between the rainshield and the center conductor might not contribute sufficiently to the total energy loss to denote that the bushing is faulty. It is desirable, therefore, to determine progressive faults due to moisture by additional means.

We have developed a test procedure, which constitutes the subject matter of this invention, the purpose and result of which are to show at an early stage, or as soon as it begins to develop, local weakness due to moisture in such bushings, and analogous faults in other forms of insulation. This procedure is applicable, not only to the bushings of oil circuit breakers, but also to potheads consisting of solid insulation, insulating supports for bus bars, and many other insulating parts. Selected uses of the method are described in the following specification to explain and illustrate the nature of the invention, but without intending to imply limitation of its utility to these specific uses. Drawings supplementing such description are provided in which—

Fig. 1 is a diagram showing the testing apparatus of Patent No. 1,945,263 applied to determine the condition of a bushing (only the upper portion of which is shown in the diagram) in the normal manner;

Fig. 2 is a view on a larger scale of the upper portion of a bushing such as used in oil circuit breakers showing in detail a practical means for increasing the electrostatic stress in that part of the bushing for further determining its condition;

Fig. 3 is a view similar to Fig. 2 showing the upper portion of a transformer bushing where the lower end of the center conductor is connected to a transformer winding or other apparatus which is contained in the tank underneath the grounded flange;

Fig. 4 shows the application of a metal band around bus support insulators for the purpose of determining the insulation properties of such bus support insulators;

Fig. 5 is a detailed perspective view of a form of metallic band or collar suitable for making the above tests.

The procedure of this invention consists generically in applying an intensified or greater electrostatic stress across the portion of the insulation in which progressive deterioration first appears, or is liable to appear. In the case of an oil circuit breaker bushing this may be effected by placing a grounded conductor $a$ around, against or adjacent to the rainshield $b$ near its upper end. Such conductor may be a band or collar of any suitable construction, a plate, or other type of electrode in contact with the insulation, or near it. We have used with good effect a spring steel strip coiled spirally like a clock spring of two or three convolutions and having an internal diameter when in the unstressed condition somewhat smaller than that of the smallest insulator on which it is designed to be used. Such a band or collar is self-adjusting to the insulator, embracing it tightly when applied, and may be very quickly applied. Its edge portions are rounded, i. e., devoid of sharp corners, in order to avoid ionization of the surrounding air under stress of applied voltages, which would cause losses to be indicated on the measuring apparatus, which were not in the insulation being measured. Thus an incorrect interpretation of the measurements would be probable. But other forms of band or collar, such as a wrapping of metallic braid; and other types of electrode, such as a plate or jaw, either supported by the rainshield or by independent means; may be used. Such a collar or equivalent electrode may be grounded by the use of a conductor $c$ equipped with clips $d$ and $e$ at its opposite ends which are attached in the manner shown by Fig. 2, one to the collar and the other to one of the bolts by which the flange of the bushing is secured to the metallic cover $f$ of the circuit breaker tank. In the following description the term "collar" is to be understood as not only designating the specific electrode shown in the drawings, but as typifying as well all other kinds and forms of electrode capable of being used in the test procedures described.

Tests made by means of the apparatus of said Patent No. 1,945,263 with the aid of such collar may materially assist in determining whether or not there is a localized fault in the upper portion of the bushing or other specimen, fabricated similarly to a bushing, which is under test. Attention is directed to said patent for the complete description of said apparatus and of the way of its use for determining power factor. Such tests made with the aid of the collar herein described have the effect of increasing the electrostatic field in selected portions of the insulation whereas the normal or standard mode of testing results in an indication of the average value of the entire insulation between the conducting stud and ground.

In practice the bushing, or other insulation under test which is similar in construction to a bushing, is tested in the regular manner as indicated in Fig. 1 and its power factor determined. The collar designated as $a$ in Fig. 2 is then applied around the upper portion of the bushing and connected by means of conductor $c$ to the ground flange $f$. Voltage is then applied between the conducting stud $g$ and the ground through the collar and connector, and the power factor of the insulation under these test conditions is similarly determined. This power factor is compared with the power factor previously obtained on the same insulation without the use of the collar. If the power factor when the collar is applied is greater than the power factor without the collar, the insulation in the upper portion of the bushing is shown thereby to have a greater loss than the average insulation of the bushing. If the difference between the two power factors is sufficiently great, it indicates that the insulation may be deteriorated to such an extent that it is advisable to remove it from service. If, on the other hand, the power factor of the insulation without the collar is high and the power factor of the insulation with the collar added is lower, the indications are that the fault is in the lower portion of the bushing; for the insulation under the collar is evidently better than the average insulation. If the power factors with and without the collar are approximately equal the indication would be that the quality of the insulation of the specimen is uniform.

In making the collar tests as described above on a given insulator the collar is generally and preferably placed underneath the top petticoat of the rainshield because deterioration originally begins in the upper portion of the insulation, but the collar may be applied at different localities and a series of tests may be made consecutively with the collar at respectively different points for more fully exploring the condition of the insulation. The foregoing test is called in practice the cold collar test because the metal collar which is placed around the insulation under test for the purpose of intensifying the electrostatic field is at ground potential.

There are some conditions encountered in field practice where the lower end of the conductor of the bushing is connected to the winding of a transformer or other associated apparatus which in turn is enclosed in a metal tank containing oil. In such cases it may be of great practical advantage to be able to determine the insulation conditions of the portion of the bushing protruding from said tank. A complete test can be made on the bushing according to the foregoing process by disconnecting the winding or other associated apparatus from the lower end of the stud of the bushing. However, this latter test can be most conveniently conducted when the oil in the tank has been lowered and the windings are being inspected or reconditioned for some reason or other and cannot readily be made without removing the oil. In the case where some indication of the condition of the insulation is required without disconnecting the transformer lead or other associated apparatus from the bushing stud, (a procedure which may require many hours to accomplish), we have devised a variation of the test procedure which we call the hot collar test and of which an illustration is given in Fig. 3. Here $h$ represents the porcelain rainshield surrounding the insulation of the bushing of a transformer, and $i$ represents the external conductive stud, or terminal of the elongated conductor which passes through the bushing. The high tension lead conductor 10 from the test apparatus is connected to the collar $a$, which is not grounded, but the conducting stud is in effect grounded, as by conductor $c'$. The following tests can thus be made by means of one or more collars: The stud $i$ of the bushing is grounded to the bushing ground flange or transformer tank as shown in Fig. 3 by means of clip lead jumper $c'$. One or more collars, one of which is designated as $a$ in Fig. 3, is placed around the porcelain rainshield of the bushing. The test voltage is applied between the collar and ground by means of a cable the end of which is designated in Fig. 3 as 10. Measurements taken in this manner are indicative of the condition of the insulation underneath and adjacent to the band $a$. If it is desired to determine whether or not the insulation condition in the region above the tank is uniform a number of collars may be applied. These collars may be placed with one or more between each two petticoats of the bushing, and they may be all connected together and the test voltage be applied between all the collars and the ground. The measuring means determine the power factor of the insulation under this condition. Having determined the average power factor of the insulation throughout a region above the ground flange this region may be explored by a single collar as shown in Fig. 3. Usually the most important point to explore for deterioration is underneath the top petticoat as indicated in Fig. 3. If the loss or power factor thus obtained is greater than the mean or average loss or power factor which was determined by using a number of collars, a local fault in the upper region of the bushing is indicated.

This type of test can readily be made in the field, not only on transformer bushings but on pothead terminals, high-voltage cable terminals, bus supporting insulators and many other insulations which cannot be readily segregated for individual tests otherwise than as herein described. Fig. 4 shows the application of the test to bus supporting insulators $j$ which rest on a grounded base $k$ and support the bus conductor $l$. The test procedure in such a case is to connect the bus $l$ to the grounded base $k$ by means of conductor $c^2$. One or more collars such as the one shown at $a$ are placed around the bus supporting insulator. These collars are connected together and test voltage is applied between these conductors as a whole and the ground structure. The average power factor or watts loss under the above test conditions is then determined by means of the measuring equipment. If the insulator is sufficiently long, one collar may be used successively at diverse and various points along the length of the insulator to determine whether or not the insulation of the bus support is substantially uniform in its insulating characteristics. Each bus insulator, two of which are shown in Fig. 4, is treated in the same manner, one or more tests being made on each individual bus support insulator.

Many and diverse pieces of apparatus not specifically mentioned herein may be treated by one or the other of the two test methods above described, and the applications of these methods to all such apparatus come within the scope of this invention. Any testing equipment capable of giving the desired comparative results on the quality of insulation may be used within the scope of this invention. Although we have shown in Fig. 1 of the drawings a diagram of the testing apparatus described in Patent No. 1,945,263, this showing is for illustration and is not a limitation of the scope of the invention. Other types of apparatus are known by the use of which power factor in insulation may be determined, and the use of such other apparatus for performing tests equivalent to those here described is within the scope of the protection claimed herein. A practically important detail of procedure is that when either type of collar test is made the porcelain should be dry and the atmospheric conditions such that surface leakage sufficient to vitiate the results will not occur.

What we claim and desire to secure by Letters Patent is:

1. The method of testing grounded insulation supporting an electrical conductor which consists in placing a metallic collar around a part of said insulation between the grounded support thereof and the conductor, connecting the conductor to ground, applying alternating voltage of known magnitude to the collar, and taking measurements determinative of the energy loss and charging current or capacitance in the insulation between the collar and conductor.

2. The method of testing the insulating qualities of an insulating bushing of a transformer, in the field, which consists in placing a metallic band around such bushing, connecting to ground the conductor which passes through the bushing and is connected with the winding of the transformer, applying alternating voltage of known magnitude to said band, and taking measurements determinative of the energy loss and charging current or capacitance in the insulation between said band and conductor.

3. The method of testing the insulating qualities of grounded insulators supporting a bus conductor which consists in placing a conductive band around such an insulator, connecting the bus conductor to ground, applying alternating voltage of known magnitude to said band and taking measurements determinative of the energy loss and charging current or capacitance in the insulation.

4. The method of testing the qualities of elongated insulation which has a grounded and a non-grounded terminal, comprising grounding the non-grounded terminal of said insulation, applying a collar around the surface of said elongated insulation, and applying test voltage between said collar and ground for making measurements determinative of the quality of said insulation.

5. The method of testing grounded insulation supporting an electrical conductor which consists in placing a conductor of substantially smaller area than the insulation contiguous to a part of said insulation between the grounded support thereof and the conductor, connecting the first named conductor to ground, applying alternating voltage of known magnitude to the second conductor, and taking measurements determinative of the energy loss and charging current or capacitance in the insulation between said conductors.

ORVILLE EMMETT FAWCETT.
FRANK C. DOBLE.